United States Patent [19]

Jueckstock et al.

[11] 4,028,762

[45] June 14, 1977

[54] METHOD OF THREADING SHORT SPOOL PIECES

[75] Inventors: Dale Allen Jueckstock, Sanford; Thomas Wayne Hindman, Sr., Gladwin, both of Mich.

[73] Assignee: Robert L. McKellar, Midland, Mich.; a part interest

[22] Filed: Feb. 25, 1976

[21] Appl. No.: 661,293

[52] U.S. Cl. .............................. 10/1 B; 10/107 PH; 29/157 R; 279/7
[51] Int. Cl.[2] ................ B23G 1/02; B23G 1/52
[58] Field of Search .............. 10/1 R, 1 B, 107 PH; 29/157 R, 559; 279/1 A, 1 SG, 7, 9 R, 96, 99, 100; 285/55

[56] References Cited

UNITED STATES PATENTS

| 429,832 | 6/1890 | Aschenbach | 279/7 |
| 2,598,423 | 5/1952 | Pealer | 279/7 |
| 2,656,191 | 10/1953 | Fladung | 279/7 |
| 3,383,750 | 5/1968 | Schroeder et al. | 29/157 R |

FOREIGN PATENTS OR APPLICATIONS

| 238,556 | 11/1945 | Switzerland | 279/7 |

Primary Examiner—E. M. Combs
Attorney, Agent, or Firm—Robert L. McKellar

[57] ABSTRACT

A method of threading short spool pieces prepared from lined pipe and a novel device for maintaining the short spool centered in a conventional pipe threading machine is disclosed. The device enables a person skilled in the craft to cut and thread short pieces of lined pipe without injuring or destroying the pipe lining.

5 Claims, 7 Drawing Figures

METHOD OF THREADING SHORT SPOOL PIECES

DISCUSSION OF THE PRIOR ART

THE INVENTION

This invention deals with a method of cutting and threading short lengths of lined pipe without injuring the lining of the pipe. It also deals with a novel device for maintaining and centering the short pieces of pipe in a conventional pipe threading and cutting machine.

The method is dependent on the device because of the fact that the conventional pipe threading machine cannot thread lengths of pipe of less than 11 or 12 inches.

The reason for this limitation is due to the construction of such pipe threading machines, that is, the machines are constructed so that the threading head is quite distant from the workholder. Such necessary elements of the threading machine such as the workholder, retaining plates, gear boxes, guide boxes, cam plates and so forth are required to be large and solidly built so that the machine can stand the rigors of threading metal pipe. Thus, these parts are large and bulky and by the time they are fitted together in their proper positions, they constitute a total length approaching 12 to 14 inches. Therefore, when pipe is set up in the machine for threading, the pipe is introduced into the machine at the end which contains the workholder. It is at this point that the pipe can be clamped to maintain it in a rigid position. The pipe is pushed through the threader until the leading end of the pipe comes through the machine and at this point any measuring, etc. that is necessary is carried out before the pipe is securely clamped. It is at this second end of the threader that the cutting head and dies are located. The distance from the clamping end of the threader to the cutting end of the threader is 11 to 12 inches. Necessarily then, any work piece shorter than 11 to 12 inches in length cannot be cut or threaded on the machines because they cannot be held securely in place.

An additional problem arises when one is attempting to cut pipe which has a plastic lining. The object in using lined pipe is to keep the pipe from disintegrating internally from caustic solutions or acids. One could normally use inert plastic pipe for such abnormal utilities but in most cases, the metal pipe is required to maintain the necessary strength of the pipe. If the plastic lining is injured or destroyed, then the object in using such pipe is lost.

It is, therefore, advantageous not only to have the ability to make short pieces of lined pipe with threads but, in addition, it is advantageous to obtain these short pieces with little or no injury or loss to the lining.

In a typical situation, the threader is used in the field, that is, the threader is used in areas of construction where there does not exist machine shops or the like. This in-field use was heretofore hampered severely because of the inability of the craftsmen to make short pieces, in the field, on the conventional threading machines. The usual method is to have those short pieces made in a machine shop on a metal lathe. This is not only time consuming but is expensive.

It is quite obvious, therefore, that any method which would allow the preparation of these short pieces on the job site, using a conventional threading machine, was highly advantageous.

It is convenient at this point to disclose that the instant invention is limited to work pieces having a minimum length of 3 inches to a maximum length of 12 inches. Any pieces shorter than 3 inches is physically impossible because of the construction of the inventive device and the construction of the threading machine. Also, when two flanges are threaded on the same workpiece, the overall length of the two flanges would constitute 3 inches. Thus, to effectively utilize the workpiece with two flanges, the minimum length of the workpiece must be 3 inches. Of course, any workpiece of 12 inches or longer will fit between the cutting head and the workpiece clamp and the inventive device is then not necessary.

It should also be noted at this point that lined pipe is connected together by way of flanges when constructed into a pipeline. It is important to understand this since the name "short spool pieces" is derived from the configuration of these pipes in their finished form. After the short piece of pipe is cut and threaded according to this invention, flanges are then threaded on each end of the threaded pipe. These flanges are threaded on the pipe until each extends one eighth of an inch or so beyond the end of the pipe. If the lined pipe was cut correctly, there is also a short piece of pipe lining extending beyond the end of each end of the pipe. In a later step in the operation, which is not part of this invention, a heating device in the shape of a cone is place over the plastic liner, the plastic is heated to soften it and the softened plastic is spread across the face of the flange. The piece of pipe with the treated flange is then bolted to another piece of pipe with a similarly treated flange and the bolts are tightened. The plastic thus forms the gasket for the flanges.

If one visualizes a short workpiece with two flanges affixed to it, one on either end, the workpiece does indeed look like an empty thread spool. Hence, the art term "short spool pieces."

For purposes of our invention and the discussion herein, "short spool pieces", "spool pieces" and "short pieces" are interchangeable terms and all terms mean pieces of plastic-line, metal pipe having lengths of 3 to 12 inches.

For purposes of clarification, the terms "conventional" and "standard" applied to threading machines and thread sizes means those threading machines typically represented by RiGiD, manufactured by the Ridge Tool Co., Elyria, Oh., and thread sizes which are commonly and ordinarily used in conventional pipe fitting.

The threading machines are presented for illustration purposes only and form no part of this invention.

The pipe utilized in this invention is metal pipe which has been lined with a plastic. Such plastic linings are well known in the art and consist typically of polyvinyl, chloride polymers, polyethylene polymers, Teflon, Kynar, curable polyurethane polymers and the like. It is not the intention of the inventors to limit this invention to any particular plastic lined pipe.

The pipe stock utilized in this invention is any metal pipe that is lined with plastic so long as the metal pipe is capable of being cut and threaded.

This invention can be carried out on pipes having inside diameters of 1 to 6 inches, however, it is preferred that the pipe stock be in the range of 1 to 4 inches. This limitation is governed by the capabilities of the particular threading machine being used. If the machine has the capability of handling 8 inch pipe, this invention can be practiced on pipe having diameters of 1 to 8 inches.

FIG. 1 shows a vertical, longitudinal cut through a device of this invention. The part labeled 1 is a hollow stabilizer bar and the part labeled 2 is a workholder which serves to hold the piece being worked on. Part 3 is a retaining lip and 4 shows internal threads in the workholder.

FIG. 2 is a vertical, longitudinal cut through a typical lined pipe designated 8, such as can be cut and threaded by the use of this invention. The part designated 5 is the pipe wall, the part designated 6 is the internal plastic lining. Part 10 shows the leading edge of the pipe.

Figure 4A:
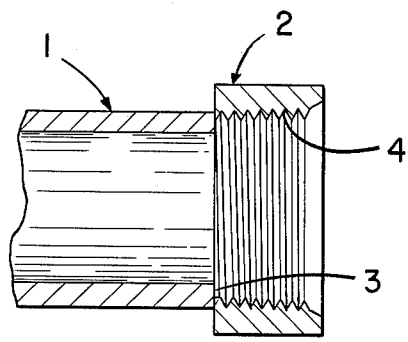
FIG. 4A shows the workholder 2 in more detail and further, shows the inventive device in proper position relative to the threaded pipe 8 as shown in FIG. 4B to receive the threaded pipe.
Figure 4B:
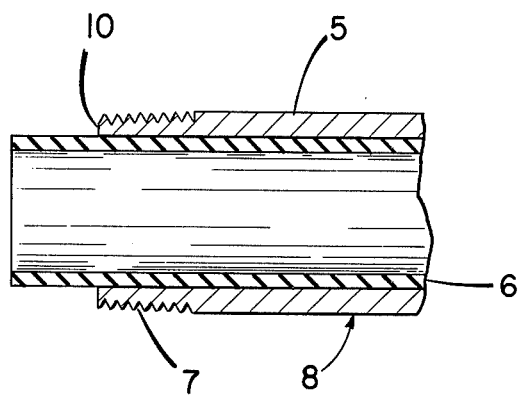

FIG. 4B shows the threaded pipe 8 in greater detail, illustrating the leading edge of the pipe 10, the pipe wall 5, the inner plastic lining 6 and the external threads 7.

Figure 5:
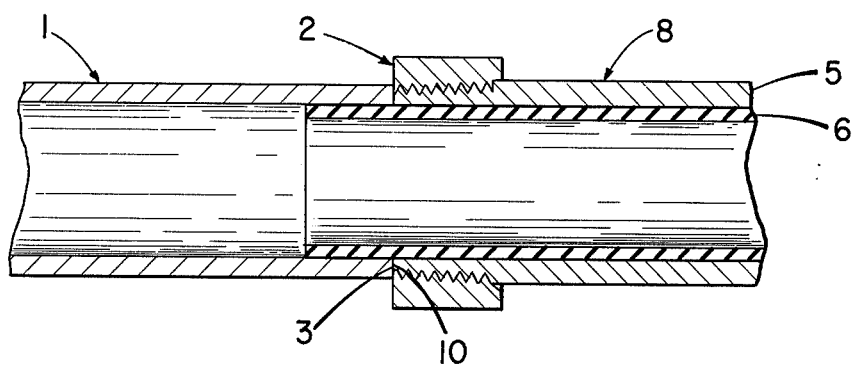

FIG. 5 shows the FIGS. 4A and 4B in a coupled position such that the leading edge of the pipe 10 meets the retaining lip of the workholder 3 securely.

Figure 6:
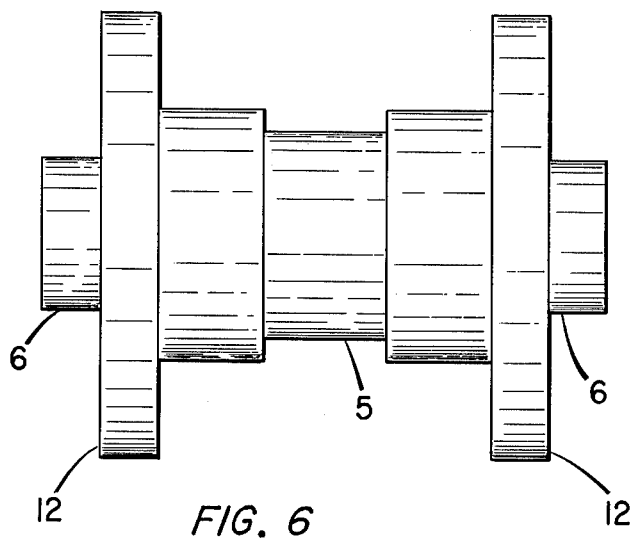

FIG. 6 shows a completed product made by the use of the invention and which consists essentially of a short threaded workpiece (lined pipe) 5, fitted on both ends by piping flanges 12 and showing the extending plastic pipe ends on each end 6.

The part designated 1, is a hollow stabilizer and guide bar. This unit is at least 9 inches in length from the back face of the workholder 2 to its distal end. The outside diameter of the stabilizer and guide bar is 1⅜ to 6⅝ inches depending on the size of the stock being worked. When the stock is 4 inch pipe, for example, the hollow stabilizer guide bar is usually also 4⅝ inches in outside diameter. Two reasons exist for this:

A. The stabilizer must be stout enough to handle the rigors of cutting the larger stock, and B. The workholder is easier adapted to the stabilizer bar, that is, no further adapters are required The inside diameter of the hollow stabilizer and guide bar is very important, in that, the inside diameter of the hollow stabilizer and guide bar must be such that it is from one-eighth to one-fourth inch smaller than the inside diameter of the workholder 2 at the interface of the two parts. This forms a retaining lip 3 which prevents the short spool from being threaded into the workpiece beyond the required depth. It should be noted that there is no plastic lining in the hollow stabilizer and guide bar.

Figure 2:
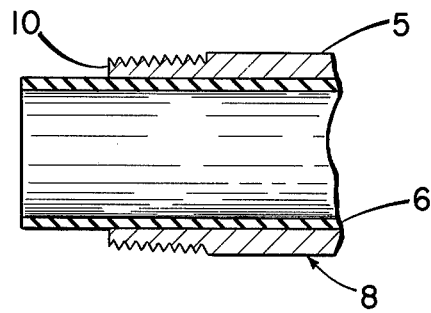
Figure 3:
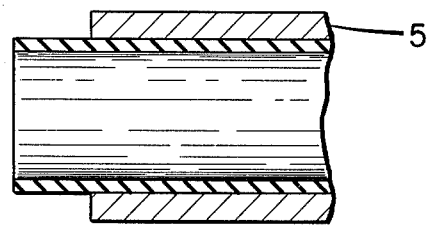
FIG. 3 shows the typical pipe of FIG. 2 before the threads have been cut.

The workholder 2 has internal standard threads 4 which receive the threaded end of a short spool piece (FIG. 2). The threads are normally slightly beveled towards the inside and, in the drawings, the threads are exaggerated for clarification. FIG. 2 is a cross-sectional view of a partially completed short spool piece without the flanges. The short spool piece is made from a piece of pipe as depicted in FIG. 3. This figure shows the pipe wall 5 and the pipe lining 6. The figure on the extreme left of FIG. 3 shows the short pipe with a section of the pipe removed to expose the pipe lining. This is the first step in the process, i.e., the removal of a predetermined section of the pipe. The amount of lining exposed is dependent on the size of pipe being used. The exposed lining will eventually be melted against te flange to form a gasket and, therefore, whatsoever will form an adequate gasket in this later step is what is left exposed. Generally for 4 inch pipe, approximately 15/16 inch of lining is exposed. For a 2 inch pipe, approximately seven-eighths inch of lining is exposed.

The next step in the method is to cut threads on the end of the pipe which shows the exposed lining. These are standard threads and are cut a standard distance and a standard depth (FIG. 2) for flanged, lined pipe.

Up until this point, the method is carried out without the inventive device.

The inventive device must not come into play as the pipe is now cut to the overall desired length which, for purposes of this invention, is less than 12 inches in length.

Figure 1:
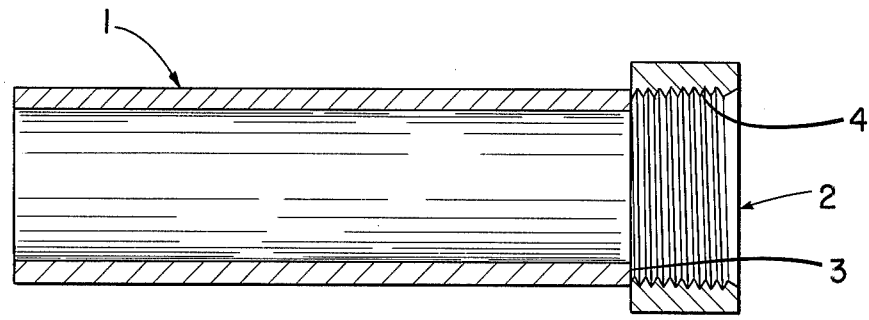

FIG. 4 shows the inventive device on the left as was shown in FIG. 1, and the threaded short pipe on the right 8 in a position in which they are about to be coupled. The short pipe is inserted in and threaded into the workholder 2 of the inventive device wherein the lining 6 slides inside the hollow of the hollow stabilizer and guide bar. The short pipe is threaded in until the leading edge of the pipe 10 contacts the retaining lip 3. At this point, the short pipe is seated, the hollow stabilizer bar protects the lining and the short pipe cannot be threaded any deeper, causing the destruction of the lining.

The device, with the short pipe so inserted, is placed in the threading machine, the short piece is positioned in the cutting dies and the clamps of the threading machine are then turned down on the hollow stabilizer bar and guide thereby rigidly fixing the short piece so that a short segment of pipe can be removed from the short pipe and the end thereby threaded as was the first end of the short piece.

To complete the method, the device is removed from the machine, the short piece removed, flanges (12) are threaded on and the exposed plastic lining is formed into a gasket. The short spool is thus shown as the finished product in FIG. 6. This short spool is then inserted in a pipeline and bolted to like pieces to form a continuous, leak-proof pipeline.

Minor changes and modifications are within the scope of this patent.

We claim:

1. An improved method of threading short spool pieces of lined pipe which method consists of
   inserting one end of a segment of lined pipe in a conventional threading machine,
   cutting a predetermined section from the other end of the pipe while leaving the lining intact,
   threading the pipe segment on the end which contains the exposed lining,
   cutting the pipe to the desired length including the threaded and exposed lining,
   reversing the threaded pipe in the threading machine so that a second end is in contact with the threading dies,
   cutting a second predetermined section of the pipe while leaving the lining intact,
   threading the pipe segment on the second end whereby a short spool piece is produced,
   wherein the improvement comprises centering and maintaining the short spool piece in the conventional threading machine by mounting said short spool piece in a device which protects the exposed lining during the cutting and threading of the second end of said short spool piece,
said device consisting of a hollow stabilizer and guide bar having a length of 9 inches or greater, an outside diameter of from 1⅜ to 6⅝ inches and an inside diameter of from one-eigth to one-fourth inches smaller than the outside diameter,
a workholder which is circular in structure and which has an outside diameter greater than the outside diameter of the stabilizer and guide bar and which has a standard threaded inside diameter of one-eighth to one-fourth inch greater than the inside diameter of the stabilizer and guide bar, said workholder having a length which is dependent on the diameter of the short spool piece being processed, which in turn is dependent upon the length of exposed lining that is desired in the short spool piece, said workholder being axially aligned and permanently affixed to one end of the hollow stabilizer and guide bar.

2. A method as claimed in claim 1 wherein the short spool piece is prepared from lined pipe wherein the lining is a thermoplastic polymer.

3. A method as claimed in claim 1 wherein the short spool piece is prepared from lined pipe having a 1 inch inside diameter.

4. A method as claimed in claim 1 wherein the short spool piece is prepared from lined pipe having a 6 inch inside diameter.

5. A method as claimed in claim 1 wherein the short spool piece is from 3 to 12 inches in length.

* * * * *